United States Patent [19]
Holson et al.

[11] Patent Number: 5,452,883
[45] Date of Patent: Sep. 26, 1995

[54] GAS SPRING

[75] Inventors: John Holson, Taylor; Fredrick R. Waldecker, Livonia, both of Mich.

[73] Assignee: Ni-Tech, Inc., Westland, Mich.

[21] Appl. No.: 254,275

[22] Filed: Jun. 2, 1994

[51] Int. Cl.⁶ .................................. F16F 9/43; F16F 7/00
[52] U.S. Cl. ...................... 267/64.28; 267/119; 267/130; 188/322.17
[58] Field of Search ................ 188/322.17, 322.22; 267/64.11, 64.28, 119, 130

[56] References Cited

U.S. PATENT DOCUMENTS

| | | | |
|---|---|---|---|
| 4,360,192 | 11/1982 | Ishida | 267/64.28 |
| 4,529,181 | 7/1985 | Wallis | 267/130 X |
| 4,544,144 | 10/1985 | Ishida et al. | 188/322.17 |
| 5,007,276 | 4/1991 | Kadis et al. | 267/119 X |
| 5,172,892 | 12/1992 | Wallis | 267/130 |

*Primary Examiner*—Robert J. Oberleitner
*Assistant Examiner*—Kevin D. Rutherford
*Attorney, Agent, or Firm*—Howard & Howard

[57] ABSTRACT

The present invention relates to gas cylinder springs and, more particularly, to gas cylinder springs which receive gas from a manifold into which the gas cylinders are threaded. The invention specifically relates to a way of automatically and in a nonmechanical manner expel atmospheric pressure from the gas spring. The piston rod of the gas spring is tapered slightly to provide a pocket into which atmospheric pressure can collect and be expelled around the gas spring seals on each stroke of the piston rod.

19 Claims, 2 Drawing Sheets

GAS SPRING

BACKGROUND

The present invention generally relates to gas cylinder springs and, more particularly, to gas cylinders which are supplied gas from a manifold into which the gas cylinders are threaded.

Gas cylinders of the type disclosed in this application typically employ a compressible gas, such as nitrogen gas, to resist the movement of a piston within a cylinder and thereby cushion the plenums of a press. These cylinders are generally of two basic types: threaded body and stand-alone cylinders. Stand-alone cylinders are self-contained gas springs which are charged with a quantity of compressible gas, such as nitrogen gas and then sealed. Stand-alone springs are placed in various openings in the plenums of a press to cushion the movement of the press.

Threaded body cylinders have a cylinder body that is open at one end with a piston rod extending out of the other end. The opened end has external threads that permit the spring cylinder to be threaded into a manifold which contains a constant supply of pressurized nitrogen gas. The manifold generally has a number of threaded openings for receipt of a number of cylinder springs. A supply of nitrogen gas is supplied to the manifold and to the spring cylinders at a predetermined pressure.

Both types of gas springs work in the same manner. A piston reciprocates within a cylinder body against a compressible gas, such as, for example, nitrogen gas. The cylinder is pre-charged with about 2,000 psi of nitrogen gas. When the piston is forced into the cylinder body, the nitrogen gas is compressed to a maximum pressure of about 3,000 to 5,000 psi, depending upon the cylinder and piston size.

Threaded body cylinders have specific difficulties which are not encountered in standalone cylinders. One problem with threaded body cylinders is when the pressure within the cylinder steadily creeps upwardly during operation. This pressure creep is caused by the leaking of atmospheric air into the gas cylinder on the downstroke of the piston. The atmospheric air leaks past the seals surrounding the piston rod. During the downstroke of the piston, a vacuum is formed, which pulls atmospheric air into the gas spring. Due to the nitrogen gas being supplied at a predetermined pressure, this pressure leaks around the seals and causes the pressure within the cylinder to constantly creep upwardly. This increased pressure has an adverse affect on the seals in that greater pressures begin to act upon the seals, causing greater wear, and in many cases, a breakdown of the seals. As the atmospheric air continually leaks around the piston head seal, the cushioning effect of the gas cylinder is substantially changed, and, in many cases, the pressure can become dangerously high.

A further difficulty in threaded body cylinders is the ingress of contaminants into the cylinder body. As atmospheric air is drawn into the cylinders, contaminants flow with the atmospheric air and begin to accumulate along the walls of the cylinder and ultimately scar the cylinder walls as the piston head reciprocates with respect to the cylinder walls.

One method of controlling this increased pressure is to vent it through the piston head and into the manifold. U.S. Pat. No. 4,342,448 discloses a threaded gas cylinder that employs a valve in the piston head that allows the pressure above the piston head to be released below the piston head when the pressure reaches a predetermined value. There are numerous problems with this type of venting system. As would be expected, contaminants flow with the pressure that flows through the valve. The contaminants are eventually forced into the manifold. It has been found by Applicant that many manifolds are heavily contaminated with environmental contaminants found in the environment wherein such threaded body cylinders operate. It is believed by applicant that the manifolds are the final resting place for the contaminants due to the ever-increasing pressure within the threaded body cylinder forcing the contaminants through the cylinder into the manifold.

The contaminate build-up in the manifold is particularly troubling when one or more of the gas cylinders is changed and the system recharged. To change the cylinders, the system pressure is released, one or more cylinders changed, and then the system is pressurized. When the system is pressurized, contaminants are believed to flow into the cylinders. This leads to scarring of the cylinder walls and greatly reduces the life of the cylinders.

Another problem with this type of venting system is the potential for contaminants to remain in the lower chamber of the cylinder before they are deposited into the manifold. Again, the presence of contaminants in the cylinder creates scarring of the cylinder walls and reduces the life of the cylinders.

A still further problem with the valve system disclosed in the '448 patent is the tendency for the contaminants to interfere with the operation of the spring which affects the ability of the cylinder to relieve pressure, as needed.

SUMMARY OF THE INVENTION

The present invention overcomes the above problems found in existing threaded body cylinders and provides a very simple economical gas spring. In the preferred embodiment, the threaded body gas spring is used for cushioning a press and includes a tubular cylinder body having an interior chamber divided by a piston into first and second chambers. The cylinder body has exterior threads which allow it to be threaded into the interior threads of the gas manifold, which supplies the adjacent chamber with pressurized gas, which acts upon the piston head of the piston. Attached to the opposite side of the piston head is a piston rod which extends out of the cylinder body and acts upon a press plenum. A sealing cap is provided at the end of the cylinder opposite the manifold and includes seals which act upon the rod to seal against the ingress of contaminants and atmospheric gas, such as air.

The seal includes a wiper scraper which wipes and scrapes the rod as it reciprocates within the gas spring. The wiper scraper is intended to reduce the amount of contaminants which enter the gas spring.

The rod of the piston has a reduced diameter adjacent to the piston head for intermittently permitting the escape of gas pressure from within the first chamber between the first seal and the reduced diameter on the rod. As the piston reciprocates within the cylinder body, any pressure within the upper chamber is burped out of the cylinder automatically.

The taper is positioned on the piston rod in such a way that it does not pass the wiper scraper at any time, which prevents contaminants from entering the cylinder through and around the taper. An annular seal is provided a spaced distance from the wiper scraper, and it is within this space that excess gas is expelled. The gas in the first chamber accumulates in the space created between the inner wall of the gas cylinder and the taper. When the piston hits top end, the gas is pushed by the seal to the atmosphere.

As should be appreciated, the taper provides a nonmechanical method for maintaining constant pressure within the gas spring. Since the increased pressure does not travel to the opposite side of the piston head, contaminants are not introduced to the lower chamber of the spring or to the manifold. Additionally, since there are no moving parts, the venting system of the present invention cannot malfunction. Still further, the taper is inexpensive to manufacture, greatly reducing the cost to manufacture the gas spring and equally inexpensive to repair and maintain.

DETAILED DESCRIPTION OF THE PREFERRED EMBODIMENT

Figure 1:
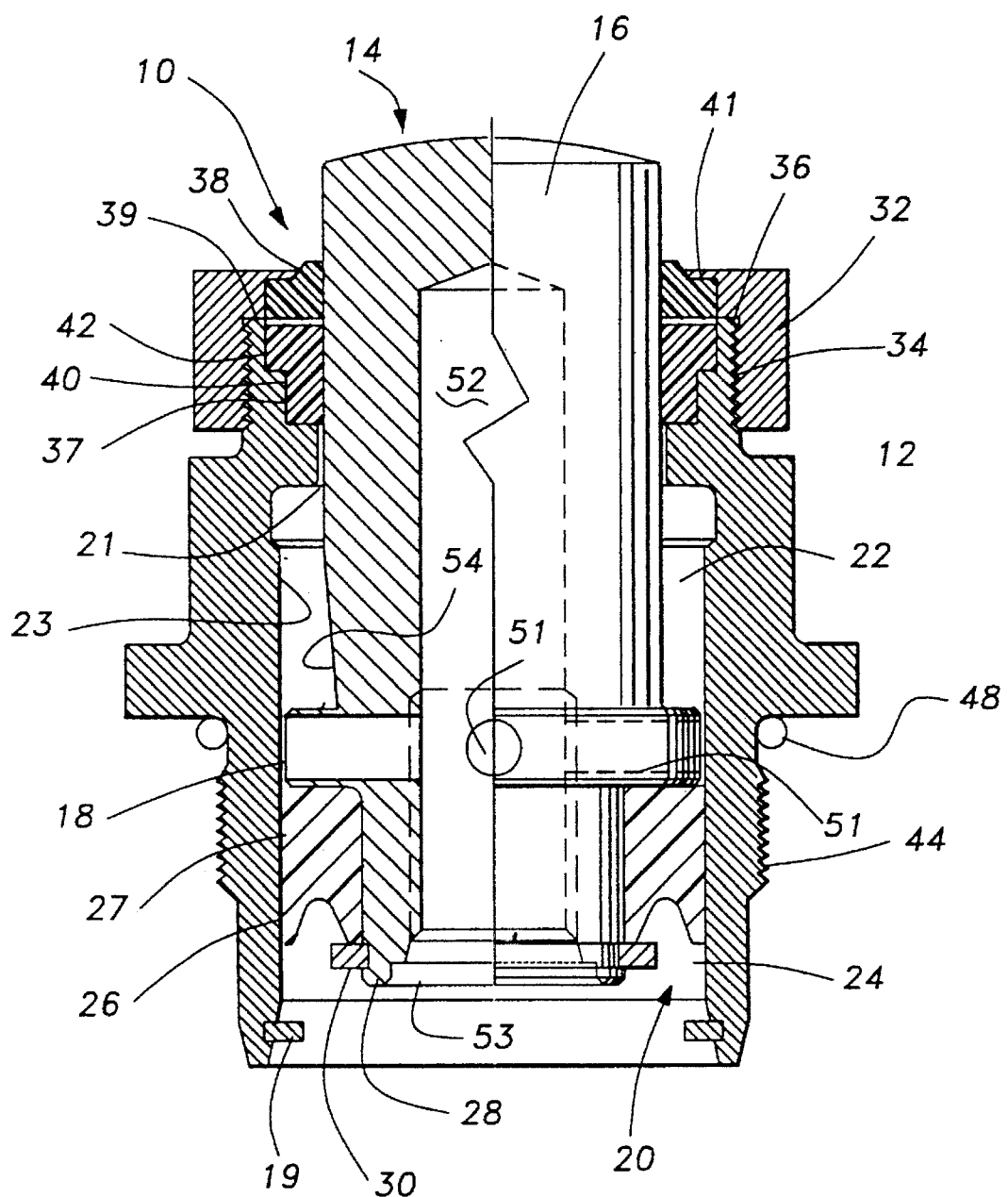
FIG. 1 is a cut-away view of the gas cylinder of the present invention, with the piston in the lower position.
Figure 2:
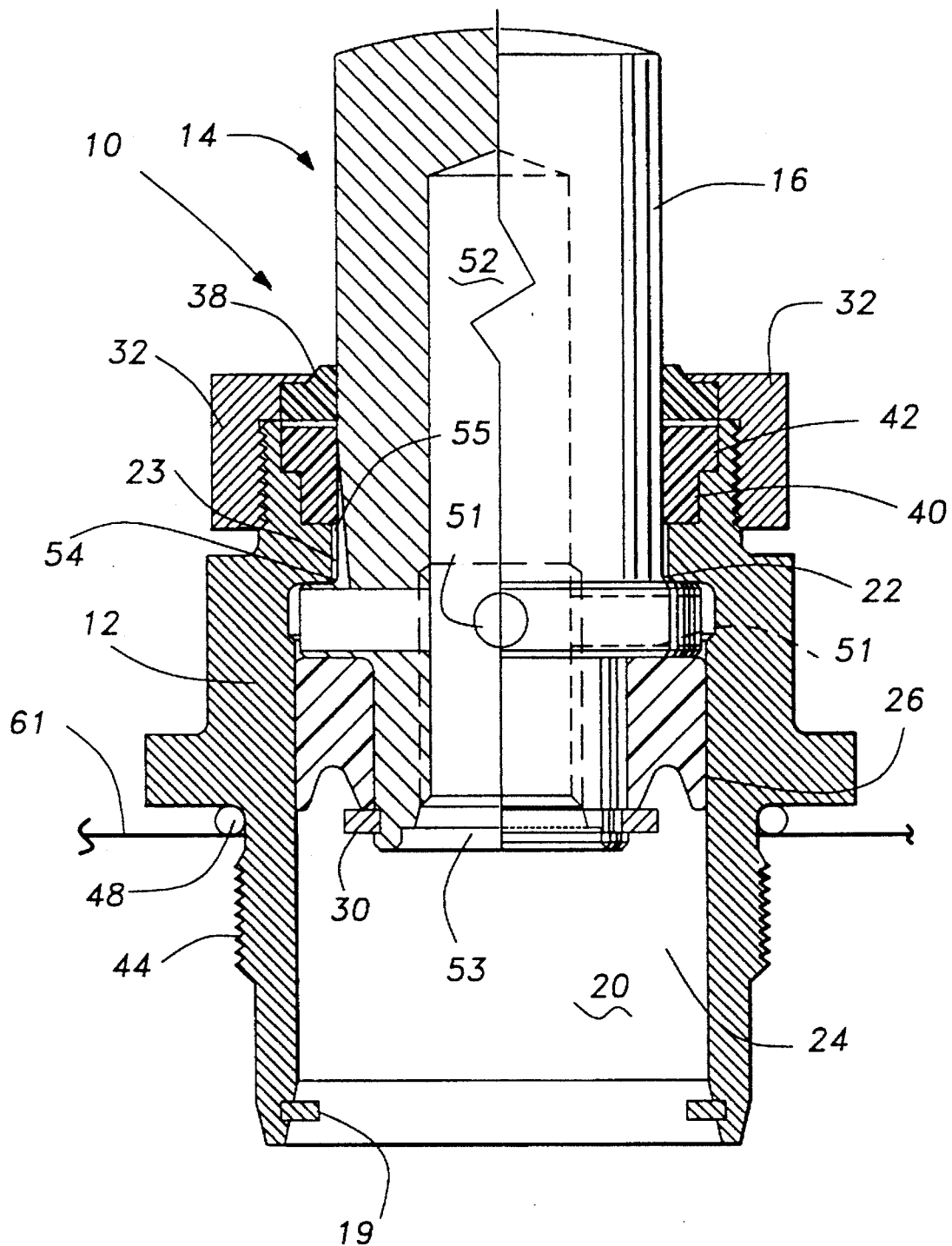
FIG. 2 is a cut-away view of the gas cylinder of the present invention with the piston at top end.

With reference to FIGS. 1 and 2, the gas spring of the present invention is shown generally at 10. Briefly, the gas spring includes a cylinder body 12, which contains a reciprocally mounted piston 14. Piston 14 includes a piston rod 16 that protrudes out of one end of the cylinder body 12. The free end of the piston rod is adapted to engage the plenum of a press in order to cushion press movement. As illustrated, the top of the piston rod 16 is crescent shaped or slightly domed. A piston shoulder or head 18 is formed at the opposite end of the piston rod. Piston head 18 is maintained within the cylinder between a snap ring 19 and a stepped wall 21 protruding inwardly from the inner wall 23 of cylinder body 12.

Piston head 18 divides the interior chamber 20 of cylinder body 12 into a first chamber 22 and a second chamber 24. The first chamber 22 and second chamber 24 are sealed with respect to one another by a cup seal 26 mounted about the piston rod 16. There is a bronze guide 27 mounted between the seal 26 and head 18 to guide the rod within the cylinder body 12. Seal 26 and guide 27 form part of the piston head 18. The cup seal has a U-shaped face, which is acted upon by gas pressure within second chamber 24 to expand the cup-shaped seal 26 and seal the first chamber 22 from the second chamber 24. Stated differently, as viewed in FIG. 1, seal 26 prevents high-pressure gas from flowing from the bottom side of piston head 18 to the top side of piston head 18. Cup seal 26 is retained upon piston rod 16 by a snap ring 30 mounted to the end 28 of rod 16.

The head 18 has two passages 51 that extend through head 18 and connect with a chamber 52 in rod 16. The chamber 52 is sealed at its open end by a plug 53. When the gas spring 10 is assembled, rod 16 is inserted and chamber 52 is filled with pressure, preferably at atmospheric pressure, and then sealed with plug 53. This pressure flows from chamber 52 through the passages 51 into chamber 22 as the stroke head 18 toward chamber 24. This added pressure reduces the vacuum that is being drawn into chamber 22. Although the vacuum is reduced, it is not eliminated, and there is still a problem with the ingress of contaminants.

The cylinder body 12 is closed at the rod end by a cap 32. Cap 32 has internal threads 34, which mate with external threads 36 on the cylinder body 12 so that the cap can be threaded onto the cylinder body 12. Cap 32 retains a scraper 38, a U-cup seal 40, and a fiber guide ring 42 within the cylinder body 12. To facilitate the retention of the U-cup seal and fiber guide ring, the inner wall 23 of cylinder body 12 is stepped at 37 and 39. The steps 37 and 39 form seats upon which the U-cup seal and guide ring rest. The cap 32 also includes a stepped configuration shown generally at 41 for mating with the scraper 38 to maintain the scraper 38 within the cylinder body and against piston rod 16. The scraper 38 is generally annular in shape and scrapes along the piston rod 16 to remove any contaminants on the piston rod to prevent their entry into the cylinder body 12. The U-cup seal 40 is positioned below the scraper 38 and facilitates the sealing of gas pressure within cylinder body 12 and prevents the ingress of contaminants and atmospheric pressure to the interior of cylinder body 12. The fiber guide ring 42 acts as a guide to facilitate proper reciprocation of the piston rod 16 into and out of cylinder body 12.

The cylinder body 12 has external threads 44 which permit the cylinder body to be threaded into a manifold 61. In the preferred embodiment, the manifold would have several internally threaded openings into which external threads 44 mate. Controlled pressure, such as pressurized nitrogen gas, is supplied to the manifold for entry into the second chamber 24 of gas spring 10. The pressure acts upon the piston head 18 to force the piston rod against the plenum of a press, and the pressurized gas acting in conjunction with piston head 18 restricts the movement of piston rod 16 into and out of gas spring 10. In this way, the movement of the press can be cushioned. In the preferred embodiment, a seal 48 is provided to maintain proper sealing of the gas spring within the manifold.

As the piston rod reciprocates within cylinder body 12, atmospheric pressure has a tendency to be pulled into the first chamber 22 of gas spring 10. As the gas spring 10 is continually used, the U-cup seal 40 begins to wear and begins to permit greater amounts of atmospheric pressure to be pulled into the gas spring 10. In order to vent this pressure, the rod 16 of the present invention is tapered at 54 to create a space between rod 16 and the inner wall 23 of gas spring 10. The taper 54 is shown in the phantom oval on FIG. 1. In the preferred embodiment, the taper is approximately 0.600 inches longitudinally and deviates from vertical approximately 0.015 inches at the widest point. The width of the tapered section is approximately 0.250 inches on a rod having a diameter of approximately 1.125 inches.

With reference to FIG. 2, the piston rod 16 is illustrated at the top end, and a space 55 is illustrated between the inner wall 23 of gas spring 10 and piston rod 16. As should be appreciated, any atmospheric pressure within gas spring 10 will accumulate in this space 55 on each stroke of piston rod 16. As the gas pressure accumulates and the piston head 18 moves to the top end, the pressure is forced into first chamber 22, past U-cup seal 40, and around fiber guide ring 42. It is permitted to escape around cup seal 40 because taper 54 extends beyond the end of U-cup seal 40 approximately 0.010 inches when piston head 18 is at the top end. By extending beyond the U-cup seal 40, the pressure acts inwardly on the inner wall of seal 40 and is permitted to escape around seal 40. Scraper 38 is not a sealing member and, therefore, the pressure is free to escape around scraper 38 and be expelled completely from the gas spring 10.

In this way, the gas spring 10 does not have a continually building pressure due to atmospheric pressure leaking around the seals. Further, it automatically, with no mechanical operation expels any built-up atmospheric pressure from the system on each stroke of the piston rod 16.

A preferred embodiment of the present invention has been disclosed. A worker of ordinary skill in the art, however, would recognize that certain modifications would come within the scope of this invention. For that reason, the following claims should be studied in order to determine the true scope and content of this invention.

What is claimed is:

1. A gas spring for use in cushioning a press, said gas spring comprising:

a tubular cylinder body having an interior chamber defined by the interior wall of said tubular cylinder, said interior chamber having pressurized gas therein, said cylinder body having opposed ends;

a piston reciprocally mounted within said interior chamber, said piston having a rod extending out of one of said opposed ends of said cylinder body, a first seal mounted between said rod and said one opposed end to seal said interior chamber from atmosphere, and a piston head, said piston head separating said interior chamber into first and second chambers, a second seal mounted between said piston head and said interior wall to separate said first chamber from said second chamber with said pressured gas being sealed within said second chamber;

said rod having a reduced diameter adjacent said piston head for intermittently permitting the escape of gas pressure from within said first chamber between said first seal and said reduced diameter as said piston reciprocates within said cylinder body;

whereby atmospheric pressure within said first chamber is regularly evacuated from said first chamber during normal operation of said gas spring.

2. The gas spring of claim 1, wherein said other opposed end has external threads adapted for mating with internal threads within a pressurized gas manifold.

3. The gas spring of claim 1, further including an annular scraper mounted to said one opposed end and surrounding said rod, said scraper wiping said rod as said rod reciprocates within said cylinder body to prevent the ingress of contaminates into said interior chamber.

4. The gas spring of claim 1, wherein said reduced diameter portion of said piston rod reciprocates past said first seal on each piston stroke.

5. The gas spring of claim 1, wherein said reduced diameter progressively decreases from above said piston head to said piston head.

6. The gas spring of claim 1, wherein said reduced diameter portion of said piston rod reciprocates past said first seal approximately 0.010 inches on each piston stroke.

7. A gas spring for use in cushioning a press, said gas spring comprising:

a tube having opposed ends and an interior chamber defined by the interior wall of said tube, said interior chamber having pressurized gas therein;

a piston reciprocally mounted within said interior chamber, said piston having a rod extending out of one of said opposed ends of said tube, a first seal mounted between said rod and said one opposed end to seal said interior chamber from atmosphere, and a piston head, said piston head separating said interior chamber into first and second chambers, a second seal mounted between said piston head and said interior wall to separate said first chamber from said second chamber with said pressured gas being sealed within said second chamber;

said rod having a reduced diameter adjacent said piston head;

a gas escape passage intermittently defined at the juxtaposition of said reduced diameter and said first seal upon piston strokes within said cylinder, said gas escape passage permitting the escape of pressurized gas from within said first chamber between said first seal and said reduced diameter as said piston reciprocates within said cylinder body;

whereby atmospheric pressure within said first chamber is regularly evacuated from said first chamber during normal operation of said gas spring.

8. The gas spring of claim 7, wherein said other opposed end has external threads adapted for mating with internal threads within a pressurized gas manifold.

9. The gas spring of claim 7, further including an annular scraper mounted to said one opposed end and surrounding said rod, said scraper wiping said rod as said rod reciprocates within said cylinder body to prevent the ingress of contaminants into said interior chamber.

10. The gas spring of claim 7, wherein said reduced diameter portion of said piston rod reciprocates past said first seal on each piston stroke.

11. The gas spring of claim 7, wherein said reduced diameter progressively decreases from above said piston head to said piston head.

12. The gas spring of claim 7, wherein said reduced diameter portion of said piston rod reciprocates past said first seal approximately 0.010 inches on each piston stroke.

13. A gas spring and pressurized gas manifold for use in cushioning a press, said gas spring comprising:

a tubular cylinder body having an interior chamber defined by the interior wall of said tubular cylinder, said interior chamber having pressurized gas therein, said cylinder body having opposed ends;

a piston reciprocally mounted within said interior chamber, said piston having a rod extending out of one of said opposed ends of said cylinder body, a first seal mounted between said rod and said one opposed end to seal said interior chamber from atmosphere, and a piston head, said piston head separating said interior chamber into first and second chambers, a second seal mounted between said piston head and said interior wall to separate said first chamber from said second chamber with said pressured gas being sealed within said second chamber;

said rod having a reduced diameter adjacent said piston head for intermittently permitting the escape of gas pressure from within said first chamber between said first seal and said reduced diameter as said piston reciprocates within said cylinder body;

whereby atmospheric pressure within said first chamber is regularly evacuated from said first chamber during normal operation of said gas spring.

14. The gas spring of claim 13, wherein said other opposed end has external threads adapted for mating with internal threads within said pressurized gas manifold.

15. The gas spring of claim 13, wherein said gas manifold has at least one opening therein, said opening having internal threads;

said other opposed end having external threads for mating with said internal threads within said pressurized gas manifold, said gas manifold supplying pressurized gas to said second chamber.

16. The spring of claim, 13, further including an annular scraper mounted to said one opposed end and surrounding said rod, said scraper wiping said rod as said rod reciprocates within said cylinder body to prevent the ingress of contaminants into said interior chamber.

17. The gas spring of claim 13, wherein said reduced diameter portion of said piston rod reciprocates past said first seal on each piston stroke.

18. The gas spring of claim 13, wherein said reduced diameter progressively decreases from above said piston head to said piston head.

19. The gas spring of claim 13, wherein said reduced diameter portion of said piston rod reciprocates past said first seal approximately 0.010 inches on each piston stroke.

* * * * *